(12) United States Patent
Kalajan et al.

(10) Patent No.: US 12,536,639 B1
(45) Date of Patent: Jan. 27, 2026

(54) COMPUTER-IMPLEMENTED SYSTEM AND METHOD FOR AUTOMATING INSPECTIONS

(71) Applicant: VuSpex Inc., Watsonville, CA (US)

(72) Inventors: Kevin Kalajan, Arroyo Grande, CA (US); Dane Demicell, Watsonville, CA (US); Sam Elhag, San Diego, CA (US); Marcus Karr, San Diego, CA (US)

(73) Assignee: VuSpex Inc., Watsonville, CA (US)

( * ) Notice: Subject to any disclaimer, the term of this patent is extended or adjusted under 35 U.S.C. 154(b) by 0 days.

(21) Appl. No.: 19/043,962

(22) Filed: Feb. 3, 2025

(51) Int. Cl.
G06T 7/00 (2017.01)

(52) U.S. Cl.
CPC ........ *G06T 7/0002* (2013.01); *G06T 2200/24* (2013.01); *G06T 2207/10016* (2013.01)

(58) Field of Classification Search
CPC ............... G06T 7/0002; G06T 2200/24; G06T 2207/10016
USPC ........................................................ 382/103
See application file for complete search history.

(56) References Cited

U.S. PATENT DOCUMENTS

| | | |
|---|---|---|
| 7,639,943 B1 | 12/2009 | Kalajan |
| 8,385,950 B1 | 2/2013 | Wagner |
| 8,418,231 B2 | 4/2013 | Denny |
| 8,665,337 B2 | 3/2014 | Mikawa |
| 8,818,018 B2 | 8/2014 | Simske |
| 10,402,064 B1 | 9/2019 | Al-Sallami |
| 10,796,374 B1 | 10/2020 | Cuttell |
| 10,878,388 B2 | 12/2020 | Wang et al. |
| 11,163,941 B1 | 11/2021 | Al Majid |
| 11,190,679 B2 | 11/2021 | Ebsen |
| 11,228,551 B1 | 1/2022 | Baron |
| 11,361,423 B2 | 6/2022 | Toth et al. |
| 11,963,072 B2 | 4/2024 | Kalajan |
| 2016/0267270 A1 | 9/2016 | Lee |
| 2017/0332421 A1 | 11/2017 | Sternberg |
| 2022/0197620 A1 | 6/2022 | Vihar |
| 2023/0247393 A1 | 8/2023 | Kalajan |
| 2023/0269105 A1 | 8/2023 | McGregor et al. |
| 2023/0308499 A1 | 9/2023 | Kalajan |

(Continued)

FOREIGN PATENT DOCUMENTS

CN 114723077 B * 12/2024 ............. G06Q 50/06

OTHER PUBLICATIONS

Chen, Hongrui, et al. "InspectionGPT: A Large Language Model-Based System for Inspection Task Planning." 2024 IEEE 13th Data Driven Control and Learning Systems Conference (DDCLS). IEEE, 2024. (Year: 2024).*

(Continued)

*Primary Examiner* — Jonathan S Lee
(74) *Attorney, Agent, or Firm* — Clause Eight; Michael Catania

(57) ABSTRACT

A computer-implemented system and method for automating building inspections are disclosed herein. This system and method expedites interpretation and inspection against documented requirements, improves accuracy in measurement and other calculations, as well as securely stores documentation against said requirements. The system includes a device with a user interface, an extraction engine running a server, a classifier engine running on the server, a database, a large language model running on the server, and a tool library on the device.

20 Claims, 9 Drawing Sheets

(56) References Cited

U.S. PATENT DOCUMENTS

2024/0193754 A1    6/2024   Karaaslan et al.

OTHER PUBLICATIONS

Svennberg, Kaisa, and Jan Ekman. "Structuring Semi-structured Data from Building Inspection Reports Using a Large Language Model." International Association of Building Physics. Singapore: Springer Nature Singapore, 2024. 508-513. (Year: 2024).*

Zhu, Xueying, et al. "Llm-Based Regulation Query System for Textual and Tabular Information in Building Codes." Available at SSRN 5033360 (2024). (Year: 2024).*

Ying, Huaquan, and Rafael Sacks. "From Automatic to Autonomous: A Large Language Model-driven Approach for Generic Building Compliance Checking." Proceedings of the CIB W78 Conference. 2024. (Year: 2024).*

\* cited by examiner

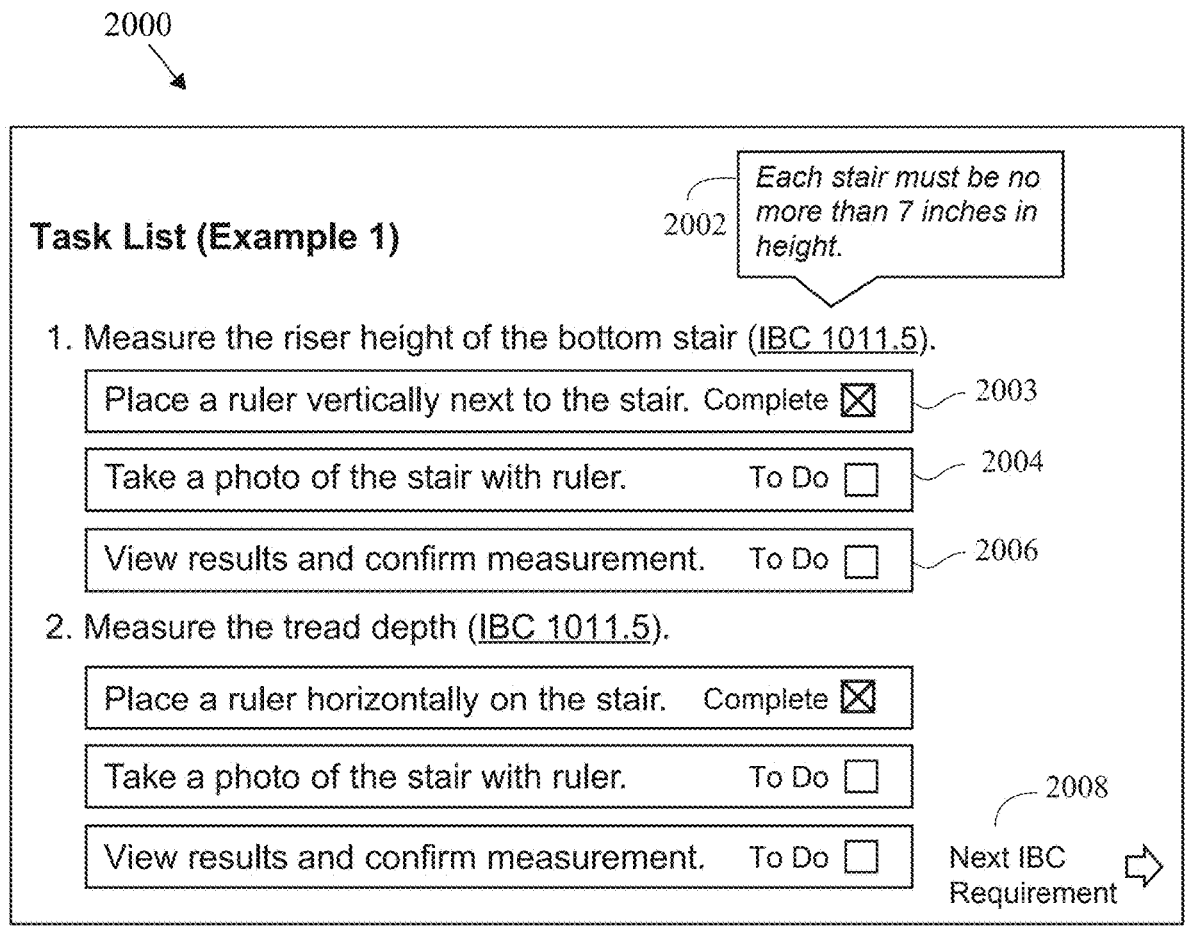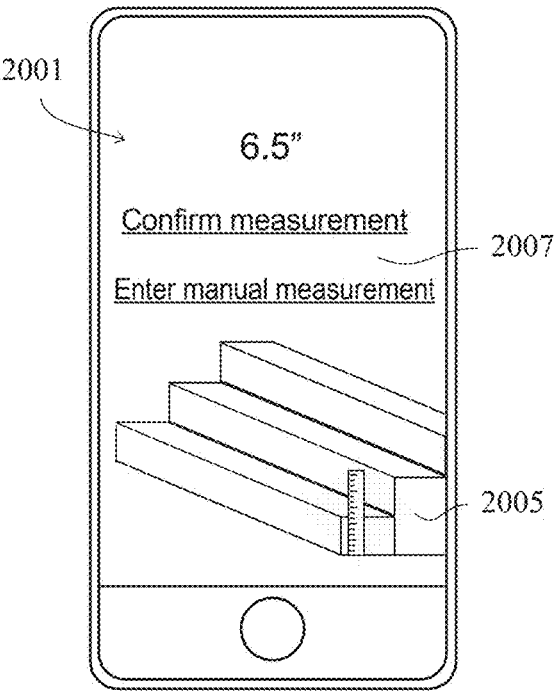
FIG. 2

3000

Task List (Example 2)

1. Verify that the rise and run is consistent across all steps in a flight of stairs (IBC 1011.5). You selected: [LIDAR ▽] — 3003

[Use the lidar function to scan the stairs.  Complete ☒]

2. Move unknown object or attempt digital removal. — 3004

[Object moved]   [Digital removal]

3. Use the lidar tool to scan unknown object.

[Scan unknown object with lidar tool.   Complete ☒]

[Accuracy too low.  View options] — 3005

4. Accuracy too low. Choose a new option. — 3006

[Use ruler tool]   [Enter manual measurements]

FIG. 3

Task List (Example 3)    4002    [====        ]    4 of 12

1. Verify stairs are compliant. (IBC 1011.5).

4003 — Record a video walking up the stairs. View Details.    Complete ☒

4004 — Your video has been converted to images.                    ⎯ 4008

4005 ⎰ 5.4 The stair rise has been estimated: *7 inches*    ✓ ✗

5.4 The stair run has been estimated: *11 inches*    ✓ ✗

5.2 The stair slope has been estimated: *35 degrees*    ✓ ✗

⎱ 8.2 The stair illumination has been estimated: *12 Lux*    ✓ ✗

(?) Help! I did not understand the following requirement.

*5.5 ADA requires contrasting strips for visibility.*

4007 — [Add text (optional)]    ⬆ Add Documentation

4009 — [ ✓ Confirm all ]

FIG. 4

COMPUTER-IMPLEMENTED SYSTEM AND METHOD FOR AUTOMATING INSPECTIONS

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

Field of the Invention

This patent application relates to the field of building inspections with conformance and compliance rules that require documentation in the various example embodiments disclosed herein.

Description of the Related Art

Building inspections play an important role in ensuring quality, compliance, and safety in construction, plumbing, electrical wiring and more. However, building inspections often involve repetitive and detail-oriented tasks with complex requirements that can be both time-consuming and prone to human error.

The complexity of requirements in building inspections include a diverse nature of parameters that must be verified. For instance, inspectors may need to assess precise measurements such as distances or clearances, verify use of a specific material, or read a gauge. Time-dependent variables, such as the elapsed time or speed of a process, further complicate matters, often requiring dynamic measurements under controlled conditions.

The requirements may differ across jurisdictions, necessitating unique expertise and awareness of the relevant codes for not only the industry, but the region.

Further, the requirements across industries and locales are not readily available in a single format. Requirements may be available on a web page, Word Documents, PDFs or other nonstandard formats creating a challenge for machine readability and databasing.

In order to prove compliance with the requirements, an inspector must record documentation in an appropriate modality (hand written or typed notes, images, or video).

Again, the documentation requirements will vary depending on the inspection type. As another example, two or more interrelated measurements may be required and in other cases, GPS location and timestamp verified images may be required.

Mobile phones have matured to include advanced capabilities (such as LiDAR, GPS location, high resolution cameras, large storage capacity, and high powered CPUs), which can be leveraged to reduce effort and time in capturing relevant documentation while improving accuracy in the building inspections process.

Modern artificial intelligence techniques and large language models make it possible to identify, interpret, and store non-standard text-based requirements in the course of an inspection.

Additionally, agentic approaches given access to goal-specific artificial intelligence models and functional tools can utilize a pre-defined set of tasks or assemble a series of tasks to validate a given inspection requirement.

BRIEF SUMMARY OF THE INVENTION

One aspect of the present invention is a computer-implemented method. The method includes importing, at a server, a file comprising a plurality of requirements for a building inspection. The method also includes extracting, at an extraction engine of the server, at least one requirement from the file. The method also includes comparing, at classifier engine of the server, the plurality of requirements, against a database. The method also includes storing the plurality of requirements and metadata in a database. The method also includes determining, at the server, a procedure for generating a task list to complete an inspection for the plurality of requirements. The method also includes calling a plurality of tool functions from a tool library on the device. The method also includes performing, on the device, a task of the plurality of tasks on the task list using a tool function of the plurality of tool functions. The method also includes marking, on the device, the task as finished on the task list. The method also includes requesting, at the server, an image or video of the finished task. The method also includes using the camera function of the device to obtain the image or video of the finished task. The method also includes confirming, at the server, that the task was completed using the image or video of the finished task. The method also includes outputting a result, at the server, about at least one requirement.

Another aspect of the present invention is a computer implemented system comprising a device with a user interface, an extraction engine running a server, a classifier engine running on the server, a database, a large language model running on the server, and a tool library on the device. The server is configured to import a file comprising a plurality of requirements for a building inspection. The extraction engine is configured to extract the plurality of requirements from the file. The server is configured to transmit the plurality of requirements to the classifier engine. The classifier engine is configured to compare the plurality of requirements against data in a database. The server is configured to store the plurality of requirements and metadata in the database. The server is configured to determine a procedure for generating a task list to complete an inspection for the plurality of requirements. The device is configured to display the task list on the user interface. The device is configured to call a plurality of tool functions from the tool library. The device is configured to perform a task of the plurality of tasks on the task list using a tool function of the plurality of tool functions. The device is configured to marking the task as finished on the task list. The server is configured to output a result for at least one requirement.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 2 is an example of an inspection task list.

FIG. 3 is a second example of an inspection task list.

FIG. 4 is a third example of an inspection task list.

DETAILED DESCRIPTION OF THE INVENTION

In various example embodiments described herein, a computer-implemented system and method for automating building inspections are disclosed, along with related capabilities of extracting, storing, and interpreting compliance requirements, as well as guiding a user, requesting user input, and reporting results meeting an appropriate confidence threshold. This system and method expedites interpretation and inspection against documented requirements, improves accuracy in measurement and other calculations, as well as securely stores documentation against said requirements.

Figure 1:
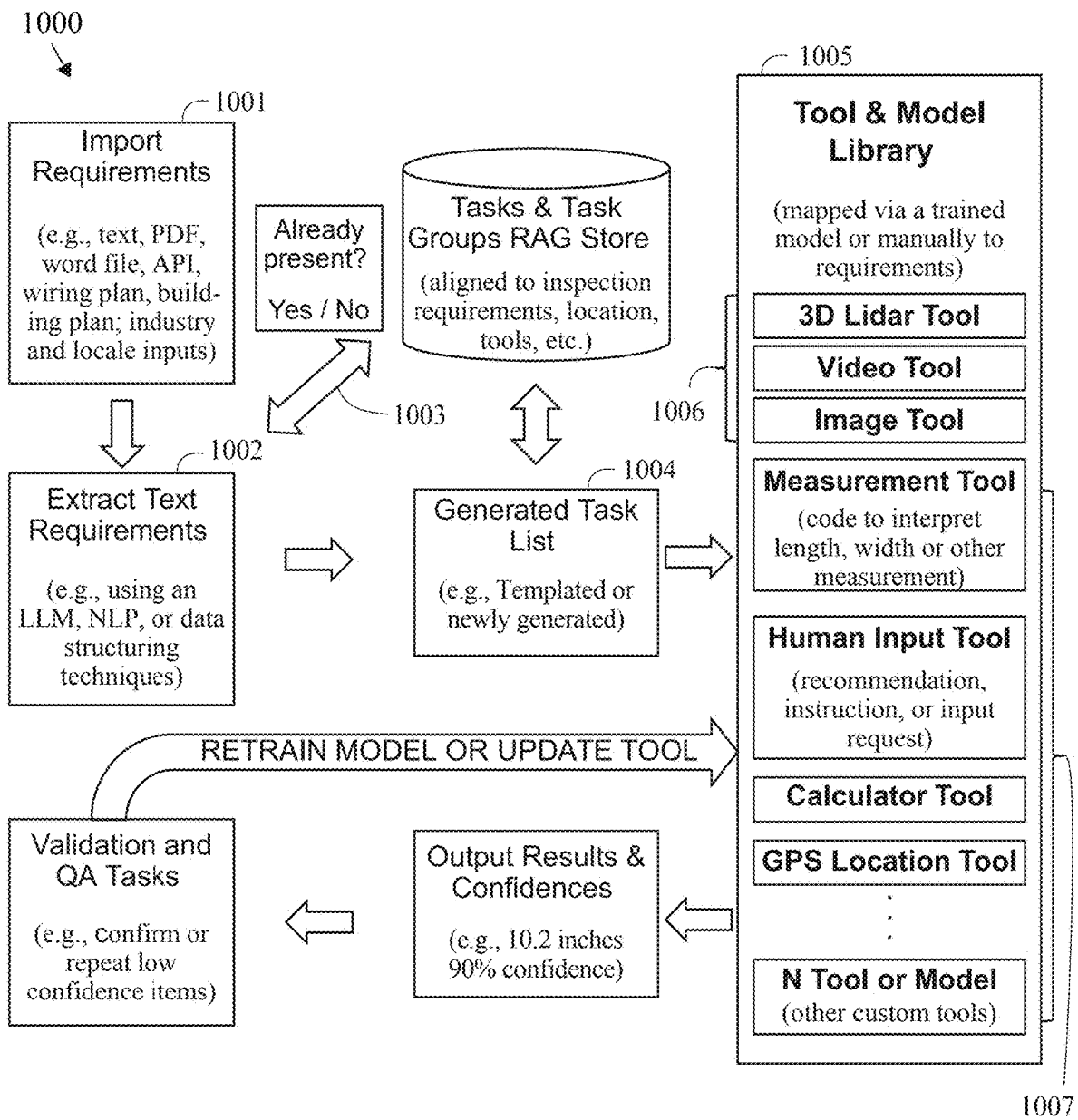
FIG. 1 is a flow chart of a general method of the present invention.

For example, in reference to FIG. 1, the disclosed example embodiments allow an inspector to simply import 1001 a set of requirements in an arbitrary format from an image to a PDF to a webpage URL and automatically generate a task list 1004 of documentation to be recorded. Furthermore, the inspector may be guided through clear task-oriented language generated by a large language model (LLM) or pulled from a task database to expedite the documentation process. The inspector may quickly access the necessary tools 1005 for a given task whether it be camera, LiDAR, or other custom measurement tool 1006, 1007 within the application.

In another embodiment, the inspector can simply take a video of a given construction project such as a stairway and the system, recognizing the stairway using an image AI model and the location via GPS coordinates, will instantly pull up the related requirements and batch process a set of tasks 2000, as shown in FIG. 2, against the video file to check for compliance. When the system is unable to interpret a requirement with confidence, it may prompt the user for input or direction. FIG. 3 shows a task list 3000 generated from user input.

In another embodiment, the system utilizes a picture or video input alone to identify the set of requirements for a specific brand, product, or even anatomical feature. Further, the system may automatically process in batch a set of tasks 4000, as shown in FIG. 4, against the inputted image or video based on the documented requirements.

In one embodiment, the system performs various processing steps to conform or optimize video or image inputs for use by a machine learning model. For example, the system receives an input video such as an MP4, AVI, or other video format and decomposes it into images. The video or images may be further processed by adjusting the contrast consistency, scaling the resolution up or down, or cropping. The images may then be analyzed by one or more models to identify features, generate tasks, or check for compliance with a given requirement.

In another embodiment, the system utilizes models that receive an input video such as an MP4, AVI, or other video format and produces results from the video in its entirety without decomposing it into individual images.

In another embodiment, the system stores the requirements in a vector database and uses Retrieval Augmented Generation (RAG) to answer user questions about relevant requirements, find the most relevant requirements, retrieve or generate the set of tasks to meet a set of requirements.

In another embodiment, the system recognizes when a requirement does not have an existing task or tool and defaults to requesting human input via a Human Input Tool. The stored data from the human input may be used for future training of a model or tool.

Existing virtual inspection systems allow a user to store text, images, and video documentation. However, they do not take advantage of the advanced capabilities and functional tools that can be layered on top of these data inputs. Standalone tools or mobile apps exist for specialized functions such as lux meters for illumination, annotation tools for highlighting or measuring distances or angles, stopwatches for recording time-based measurements such as water flow rates, but no system unifies these tools and maps them to relevant inspector functions in real-time.

Some systems host databases of requirements such as the International Residential Code or International Building Codes for certain industry building inspections. However, no systems allow arbitrary input of requirements from disparate systems in disparate formats, let alone automate their ingestion and interpretation.

Figure 9:
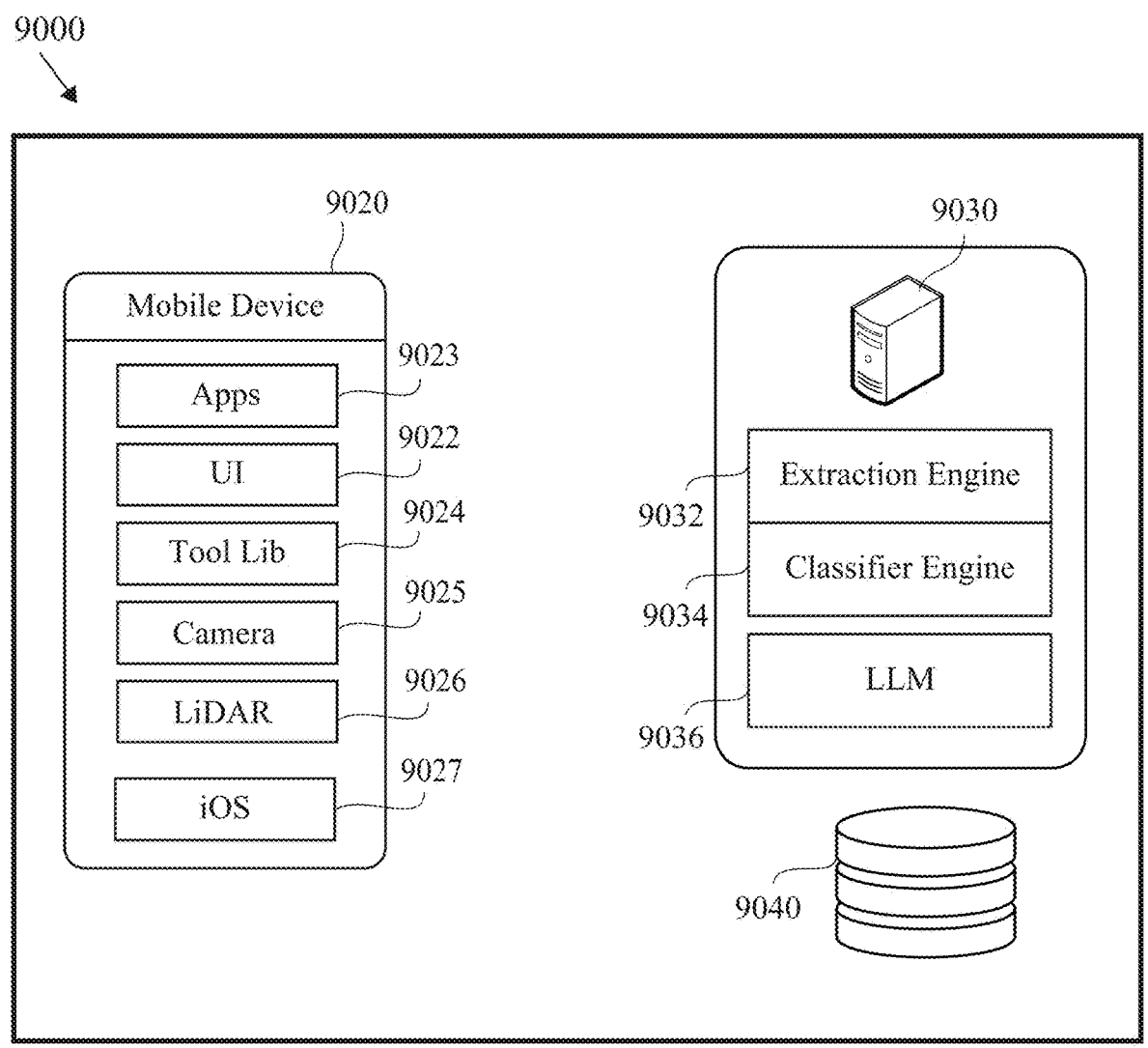
FIG. 9 is a block diagram for a c computer-implemented system.

The various components of the system include, in at least one embodiment, the following components, in reference to FIG. 9: a) A USER INTERFACE 9022 for importing an arbitrary format of documented inspection requirements, responding to system generated tasks, and providing reinforcement feedback through validation and confirmation of system results; b) an EXTRACTION METHOD 9032 for gathering the relevant metadata such as code IDENTIFIER, regional information, and requirement text; c) a CLASSIFIER 9034 for determining the inspection tools relevant to a given Requirement along with a confidence score; d) a DATABASE 9040 for storing and retrieving inspection requirements, relevant metadata, related tasks, and tools; e) an AGENT in collaboration with a LARGE LANGUAGE MODEL 9036 optimized to generate a Task List from a given Requirement or Requirement Set; f) a TOOL LIBRARY 9024 with access to native applications such as the camera 9025 or LiDAR 9026 as well as customized tools 9023, such as a measurement tool, calculator tool, or form input tool, or AI models to add or interpret data; g) a FEEDBACK DATA CAPTURE mechanism for retraining and optimizing machine learning models and tools.

The present invention provides a comprehensive system and method for managing building inspections across industries, addressing challenges related to diverse requirements and formats, documentation variability, and jurisdictional compliance.

In one embodiment, the appropriate tools for a given requirement are predicted using machine learning. The method employs a natural language processing (NLP) model, such as a Transformer-based architecture (e.g., BERT or GPT), to analyze and interpret the intent of a given requirement. A labeled dataset mapping input queries to corresponding tools (e.g., calculator, web search, GPS coordinates) is utilized to train the model. Training may be performed using frameworks such as TensorFlow or PyTorch, with fine-tuning facilitated by pre-trained models available through various libraries. Classification of tool predictions may be continually optimized by incorporating user feedback on correct or incorrect tool designations.

In one embodiment, some of the Tools are AI Models trained on text, video, and imaging data. These models may be trained to identify specific brands or models, specific building components (e.g. pipes, wires, stairs) or to identify whether a given component meets a requirement. As an illustrative example, if a given wire must be the color blue, a dataset of images tagged as showing "blue" wires or not showing "blue" wires, could be used to generate a high-quality model that makes this determination from an image.

In another embodiment, users verify all outputs of Tools or Models that check for requirement compliance. In this process, the users mark the results as accurate or inaccurate and may correct the results whether measurements, segmentations, or other values. This data is then used to train a new model or retrain an existing model.

In one embodiment, the Task to demonstrate that a Requirement is met is generated by a large language model. This model may have been augmented with training data mapping Requirements to Tasks. Additionally, the user interface of the application may display the Task with the Requirement text, allowing the user to provide positive or negative feedback on the validity of the Task or alter the text of the Task. This feedback may be used to optimize or retrain the algorithm or language model.

Figure 8:
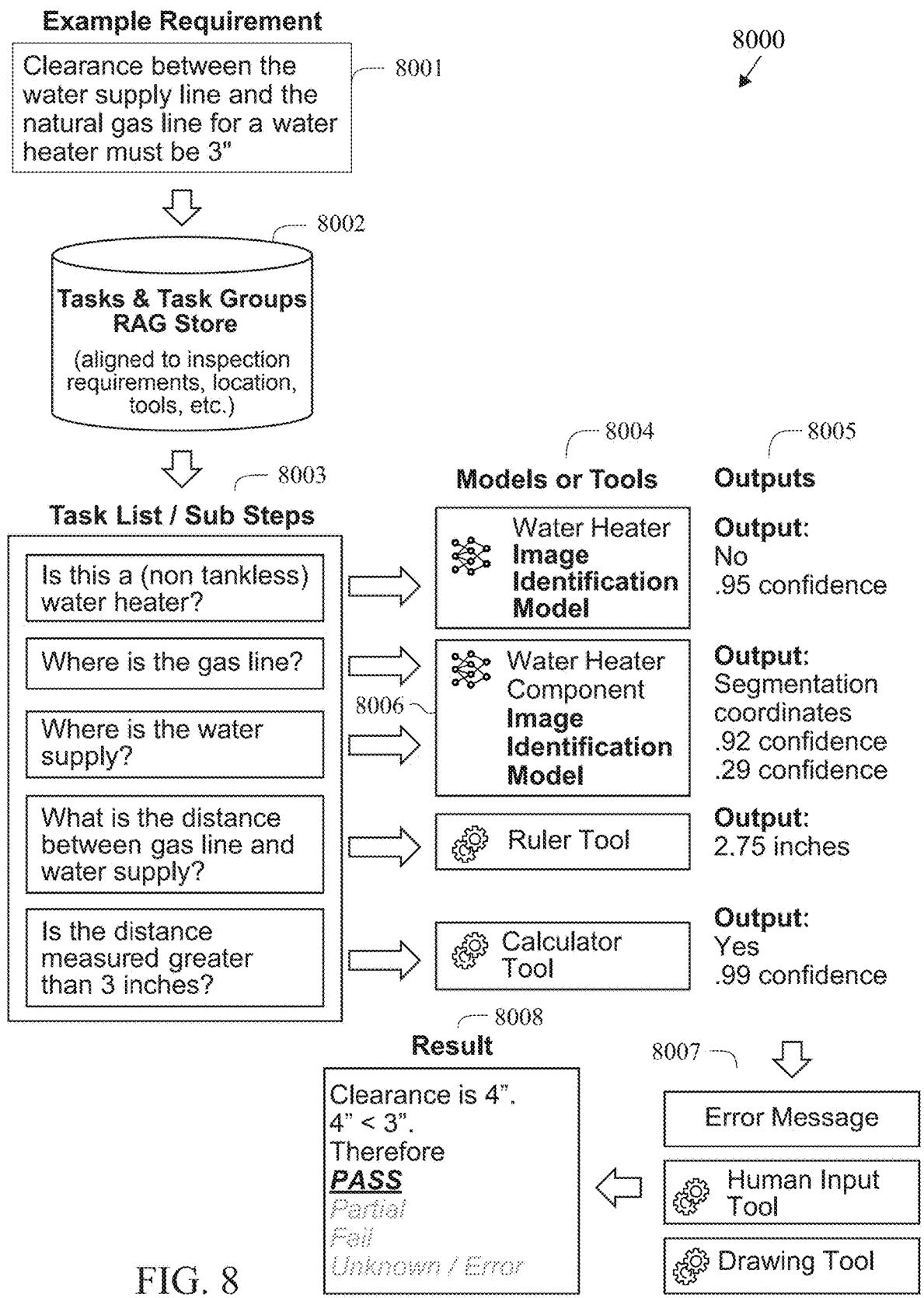
FIG. 8 is a flow diagram from requirement to result.

In one embodiment, for a given requirement, Task, or Task List, the system outputs a status indicating whether the inputs indicate a Failure to comply, Partial compliance, Pass for full compliance, or Unknown due to low confidence in the result or an error state. For example, as shown in FIG. 8, a requirement 8001 that a water supply line is 3" or greater distance from a natural gas line necessitates that the system can complete at least three Tasks as part of a Task List 8003 (1) identify a gas line (2) identify the water supply line and (3) measure the distance between them. For the first Task to identify a gas line, the system may output Unknown if it returns a low confidence score for the image. Similarly, the overall Requirement result may be given as Unknown until the Task is corrected or completed by human input. If all Tasks in the Task List 8003 for the Requirement, whether through manual input or an AI model, indicate a Pass status, then the overall Requirement status will be Pass 8008. If, however, a criterion is not met, the system will indicate a Failure or Partial compliance status depending on the specifics of the Requirement.

In another embodiment, the compliance result includes outputted logic for meeting, partially meeting, or failing the requirement. For example, if a measurement must be greater than 5 inches, the system may output that a 6 inches measurement is greater than 5 inches and thus it has met the requirement in full.

Various technologies enable users to record audio, video, and images and annotate them in structured or unstructured ways. Additionally, various tools, often in the form of mobile applications 9023, exist to perform measurement or annotation functions such as light meters, angle detectors, or stud finders that are useful in the process of building inspection. However, none of the prior art translates from a given inspection requirement(s) to the necessary tasks and tools and further automates the utilization of those tools through machine learning or artificial intelligence models.

U.S. Patent Application Publication Number US20240210330A1 references receiving image or video and identifying defects through sensed data to predict the lifetime of a target component such as an air conditioning system or escalator. However, this system does not interpret plain text requirements or solve for the variance in requirements by locale or governing body. Moreover, it focuses on identifying defects rather than recognizing compliance with a comprehensive series of requirements. Lastly, it does not introduce manual input where necessary for both verification and corrections by an inspector.

U.S. Pat. No. 11,361,423 describes a method for inspecting infrastructure for defects by training image classification models. It does not organize these models, align them to specific tasks, provide a mechanism to match dynamic requirements to manually delivered content, or automate the use of the models based on user requirement input.

U.S. Patent Application Publication Number US20240193754A1 uses hybrid data from a mixed reality headset to capture images for infrastructure assessment. Yet again, this system is defect oriented and does not align any of the inputs to associated requirements, nor does it utilize language models for interpretation and alignment to maximize system coverage.

U.S. Pat. No. 10,878,388 describes an image classification system for identifying infrastructure defects and severity. This system identifies defects, but does not directly analyze features or measurements. Additionally, the system does not generalize beyond each specific classification as it does not align to an inputted requirement or set of requirements nor identify cases that cannot be calculated automatically and yield to manual analysis.

As described in this application, building inspections require support for a multitude of comprehensive requirements by location and other parameters. The automatic interpretation and alignment of these requirements using large language models and pre-defined templates to a set of available tools, models, and human input is the bridge required to expedite and automate building inspections in the real world.

Those skilled in the art will recognize that the included figures provide only a few illustrative examples of possible embodiments of the present invention. It is to be understood that the scope of the present invention includes the many combinations, modifications, and embodiments that may be derived from these illustrations.

FIG. 1 is a flow diagram for a method for automating virtual inspections 1000, wherein a set of documented rules of conformance and compliance (requirements) in any format such as Word Doc, PDF, web URL, JPG, or other format is imported into the system 1001. Next, the requirements are extracted from the file using one or more techniques depending on the file format. For example, the system may use Optical Character Recognition (OCR) to extract the text and send it to a Large Language Model (LLM) such as LLama, OpenAI, or a custom trained LLM 1002. The requirements, file name, or other identifiers are compared against the existing Retrieval Augment Generation (RAG) database. If they already exist, the system will move on. If they do not already exist, the requirements are vectorized and stored. The requirements are stored along with relevant metadata such as the industry, location, governing body, and source 1003. An agent determines the best method for generating a task list to complete the given inspection of the requirements. The agent may pull an existing Task List, pull a new set of Tasks from the RAG store, or create an entirely new Task using an LLM interpretation of given requirement(s). The Generated Task List for the set of requirements is displayed to the user 1004. As the user navigates through the task list, a Select Tools function calls appropriate tools to the forefront of the application based on the requirement. This function may utilize a model trained to select appropriate tools based on the requirement text or simply based on a database of manual mappings 1005. The most common input tools are the 3D LiDAR Tool, Video Tool, and Image Tool (camera) 1006 which are available for many modern phones such as the iPhone. Custom tools may additionally be called that may utilize the LiDAR data, Video data, or Image data. For example, a Measurement Tool may use Image data to determine the width or length of an object. Similarly, a Calculator Tool may be called by the Agent to compute a ratio or other value. Custom tools will be added over time to increase the overall set of requirements that can be automated 1007.

FIG. 2 illustrates a Generated Task List that requires manual user actions to support use of a digital tool 2000. A Task List item is aligned to a requirement such as International Building Code (IBC) 1011.5 from the International Code Council (ICC) 2002. The user is able to mark each task as "Complete" as it is performed. In the example, the user has placed a ruler vertically next to a stair to document its height 2003. Next, the Task List requests that the user take an image of the stair with a ruler 2004. When a user clicks that task, the camera tool is opened to take an image of the ruler placed next to the stair 2005. The user clicks to view the results and confirm the measurement 2006. On the phone display 2001, the user is presented with a measurement such as 6.5" and may confirm the measurement or enter a manual measurement 2007. Manual measurements are stored along with the automated measurement for review and augmentation of the associated artificial intelligence models or tools. Upon completion of the tasks associated with the given requirements, the user may navigate to the next related requirement 2008.

FIG. 3 illustrates a Generated Task List that allows the user to choose from various approaches whether manual, automated, or tool-specific 3000. For example, the user has created a LiDAR scan of the stairs which may be a faster approach than individual ruler measurements 3003. Next, the system reports an unknown object in the scan and gives the user the option to move the object or attempt a digital removal 3004. The user scans the unknown object but reports that the confidence threshold for accuracy is too low to use the results 3005. Finally, the user is given the option to use an alternative tool such as the Ruler Tool or to conduct the inspection manually and input the results 3006.

FIG. 4 illustrates another embodiment of the invention in which the system accepts an input such as video, image, or LiDAR and attempts to batch process the requirements for the user 4000. The user has recorded a video walking up the stairs per the input request by the system 4003 and a progress bar 4002 is shown indicating the number of steps completed to meet the Task List for the related requirements. The video file may be processed in various ways depending on the requirements or tools. In this case, the video has been converted to multiple images to be processed individually 4004. The system automatically estimates measurements, angles, and even luminosity using a series of tools in batch 4005. For any requirement the system does not recognize or interpret with a high confidence threshold, it may indicate to the user that it needs assistance. The user is prompted to enter the appropriate text or upload relevant documentation 4007. Finally, the user may confirm or reject individual outputs, which will be used to augment the system accuracy 4008 or confirm all results in bulk, thereby vastly expediting the inspection process 4009.

Figure 5:
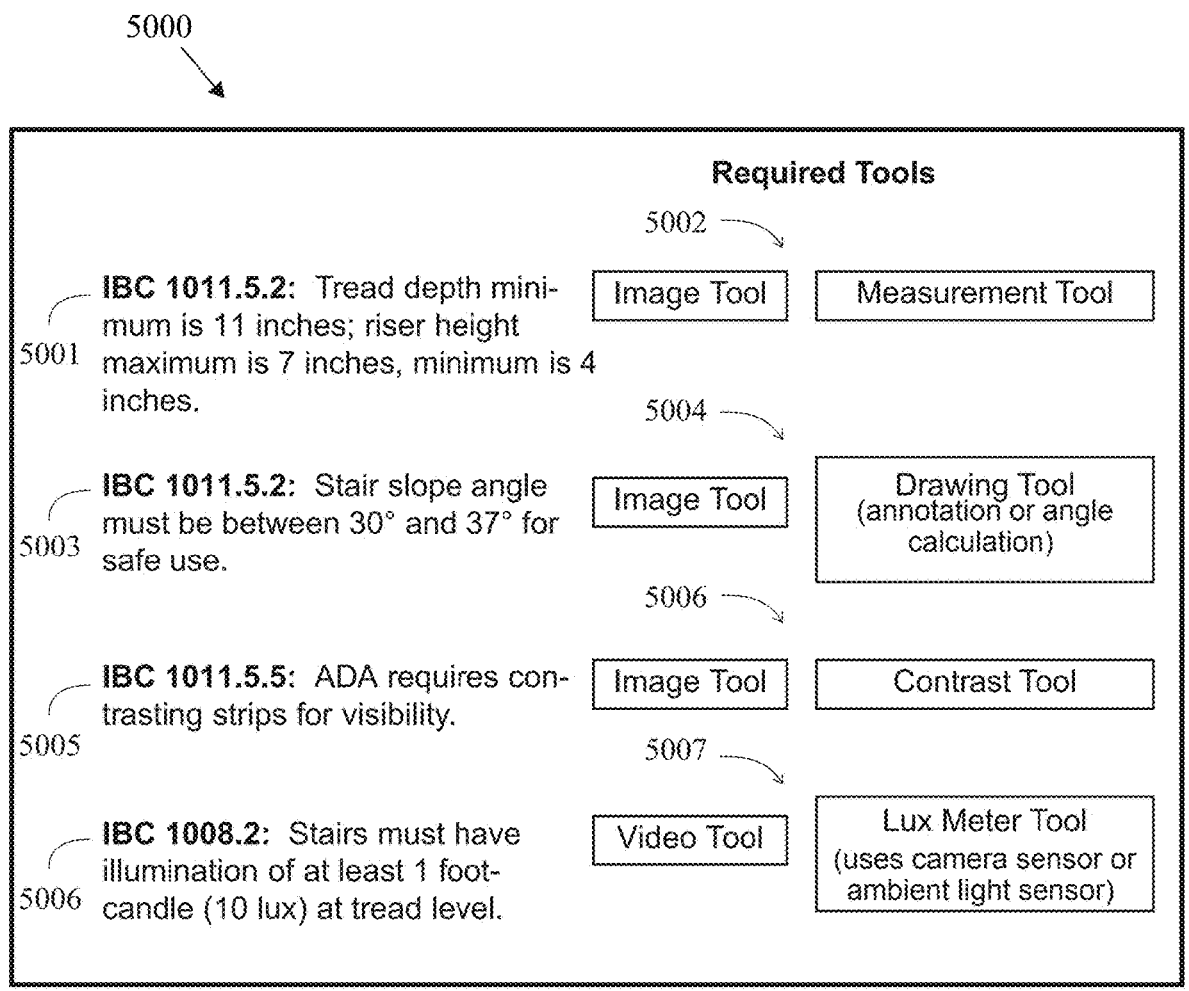
FIG. 5 is an example of compliance requirements mapped to relevant tools.

FIG. 5 illustrates an example set of requirements mapped to specific tool functions 5000. This data may be created in many ways including (1) manually (2) user input or (3) custom prediction model. The IBC requirement shown at 5001 indicates a measurement as it includes words such as depth, height, and inches. As such, it is mapped to the Image Tool and Measurement Tool to capture the appropriate data 5002. The IBC requirement shown at 5003 indicates an angle is required and is thus mapped to the Image Tool and Drawing Tool, which supports an angle calculation 5004. The IBC requirement shown at 5005 uses the words contrasting and visibility. The use of ADA may also indicate the need for a specialized image tool. As such, it is mapped to the Image Tool and an even more specialized Contrast Tool 5006. Lastly, the IBC requirement shown at 5006 uses the words illumination and lux suggesting a need to measure an illumination level. This will be accomplished using the Video Tool and the Lux Meter Tool 5007.

Figure 6:
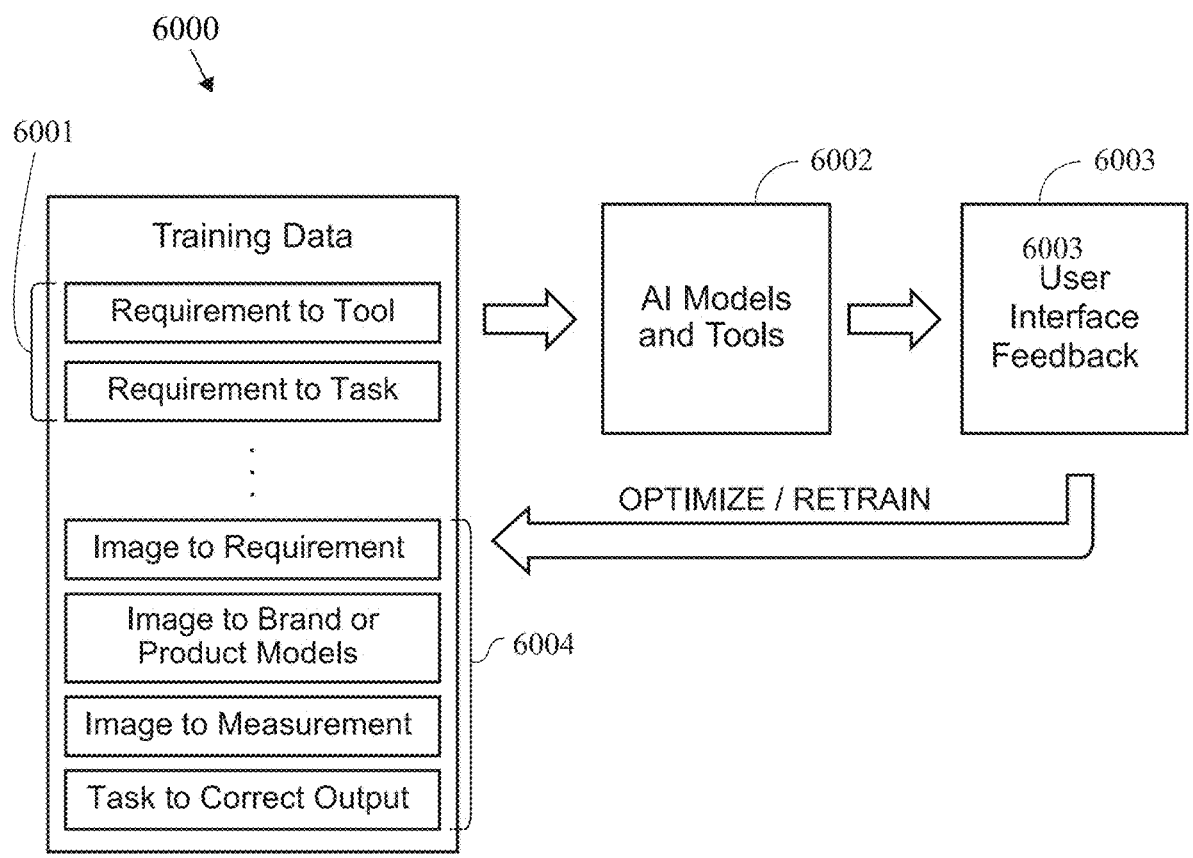
FIG. 6 is a flow diagram of a training cycle for machine learning models.

FIG. 6 is a flow diagram of the training cycle for machine learning models 6000. The diagram shows example training data types such as Requirement to Tool and Requirement to Task 6001. The training data is used to build AI Models or Tools 6002 that can be called by the system Agent. The User Interface provides the system with positive or negative feedback 6003 that is fed into the training data for optimization and retraining of the models. The system may also use multimodal data for training AI Models such as image data aligned to the requirements (e.g. a staircase begets IBC 1011.5 to N), image data aligned to specific brands or product models, or image data aligned to measurements 6004.

Figure 7:
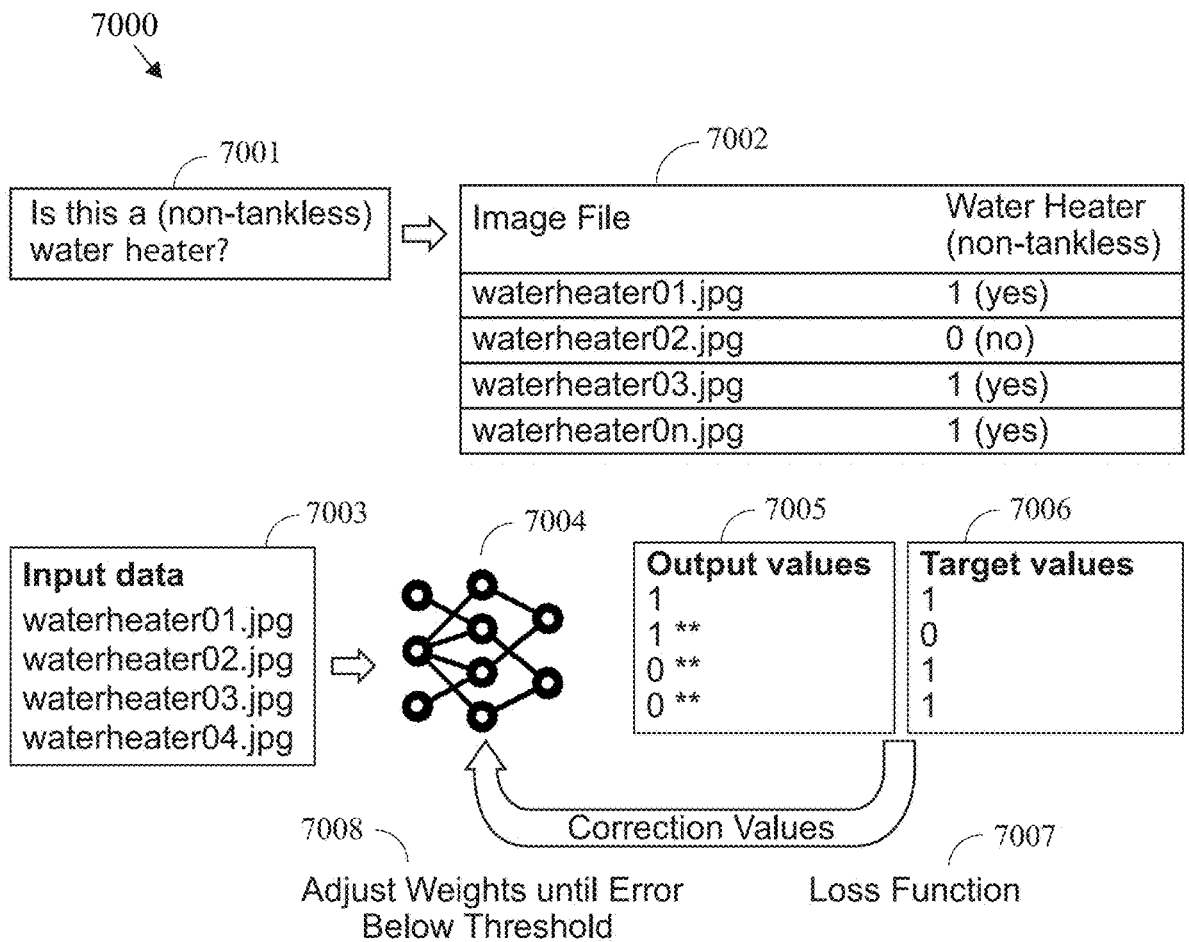
FIG. 7 is an example set of training data for a model.

FIG. 7 shows one example of a training set 7000 for a single requirement that necessitates recognizing a water heater as non-tankless 7001. In this specific example, a training data set could be composed of various image files aligned to whether or not they are non-tankless water heaters 7002. In one embodiment of a training process, a portion of the data would be inputted 7003 into a Convolutional Neural Network (CNN) 7004 resulting in Output Values 7005 that can be compared to the corresponding Target Values 7006 using a Loss Function, which quantifies the error 7007 and is used to adjust the model weights through backpropagation to reach a desired error threshold 7008.

FIG. 8 is a flow diagram 8000 wherein an example requirement 8001 is used to identify an existing Task List to verify compliance with the requirement from a RAG data store 8002. The Task List is composed of a series of steps 8003 that are in turn aligned to Models or Tools in the system. These Models or Tools may be manually aligned or aligned by a predictive algorithm as previously described 8004. As shown, the Model output values may be binary (e.g. yes, no or 1, 0), measurement values (e.g. 2.75 inches), coordinates for image segmentation, or other modalities. The outputs include a confidence interval where relevant 8005. A Model may be very specific to a Task (e.g., identifying a water heater type) or more general such as identifying various components of an object (e.g. Water Heater Component Image Identification Model is used for both identifying gas lines and a water supply) 8006. If a model returns a low confidence score for a result, the user may receive an error or be directed to verify the output or use a manual tool for input such as a Drawing Tool 8007. Finally, the system will return an overall result of Fail, Pass, Partial, or Unknown to indicate whether the requirement is met 8008.

FIG. 9 is a block diagram of a computer implemented system 9000, comprising of a device 9020 with a user interface 9022 and a tool library 9024, an extraction engine 9032 and a classifier engine 9034 running on a server 9030, a database 9040, and a LLM 9036 running on a server 9030.

The device 9020 is preferably a mobile communication device. It 9020 includes an OS 9027, applications 9023, a camera 9025, and a LiDAR sensor 9026.

The server 9030 imports a file comprising requirements for a building inspection. The extraction engine 9032 extracts the requirements from the file. The server 9030 transmits the requirements to the LLM engine 9036. The classifier engine 9034 compares the requirements, the file name, and at least one identifier for the file against data in a RAG database. The server 9030 stores all of the requirements and metadata in the database 9040, then determines a procedure for generating a task list to complete an inspection for the requirements.

Preferably, the task list is aligned to an IBC 1011.5 from the ICC.

The device 9020 displays the task list, calls tool functions from the tool library 9024, and performs a task from the task list using a tool function. Preferably, the tool functions comprise of a 3D LiDAR Tool, a video tool, an image tool or a calculator tool.

After the device 9020 marks the task as finished, the server 9030 requests an image or video of the finished task, The device 9020 uses a camera function 9025 to get an image or video of the finished task, and the server 9030 confirms that the task was completed using that image or video.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A computer-implemented method comprising:
   importing, at a server, a file comprising a plurality of requirements for a building inspection at an inspection site, the plurality of requirements comprising requirements from disparate systems in disparate formats;
   extracting, at an extraction engine of the server, at least one requirement from the file;
   comparing, at a classifier engine of the server, the plurality of requirements, against a database;
   storing the plurality of requirements and metadata in a database;
   determining, at the server, a procedure for generating a task list to complete an inspection for the plurality of requirements;
   transmitting the procedure and the plurality of requirements from the server to a mobile communication device located at the inspection site;
   calling a plurality of tool functions from a tool library on the mobile communication device, wherein the plurality of tool functions comprises at least one of a 3D LiDAR Tool, a video tool, or an image tool;
   displaying on a user-interface of the mobile communication device, the plurality of tool functions;
   performing, on the mobile communication device, a task of the plurality of tasks on the task list using a tool function of the plurality of tool functions;
   marking, on the device, the task as finished on the task list;
   accepting, at the server, an image or video of the finished task;
   using the camera function of the device to obtain the image or video of the finished task;
   confirming, at the server, that the task was completed using the image or video of the finished task; and
   outputting a result, at the server, about at least one requirement.

2. The method according to claim 1 wherein a format of the file is Word Doc, PDF, web URL, JPG, PNG, GIF.

3. The method of claim 1 in which the extraction engine is a large language model.

4. The method of claim 1 in which the database is a vector database.

5. The method of claim 1 in which the result output is a pass, fail, or partial pass.

6. The method of claim 1 in which the result output is an error or request to complete another task.

7. The method of claim 1 in which the result output is a description of a requirement and the manner in which the requirement was not met.

8. The method of claim 1 in which the result output is a description of a requirement and the manner in which the requirement was met.

9. The method to claim 1 wherein the task list is aligned to a local or regional standard.

10. The method according to claim 1 wherein the task list is aligned to an International Building Code 1011.5 from the International Code Council.

11. A computer implemented system comprising:
    a mobile communication device with a user interface;
    an extraction engine running a server;
    a classifier engine running on the server;
    a database;
    a large language model running on the server; and
    a tool library on the mobile communication device;
    wherein the server is configured to import a file comprising a plurality of requirements for a building inspection at an inspection site, the plurality of requirements comprising requirements from disparate systems in disparate formats;
    wherein the extraction engine is configured to extract the plurality of requirements from the file;
    wherein the server is configured to transmit the plurality of requirements to the classifier engine;
    wherein the classifier engine is configured to compare the plurality of requirements against data in a database;
    wherein the server is configured to store the plurality of requirements and metadata in the database;
    wherein the server is configured to determine a procedure for generating a task list to complete an inspection for the plurality of requirements;
    wherein the server is configured to transmit the procedure and the plurality of requirements to the mobile communication device located at the inspection site;
    wherein the mobile communication device is configured to display the task list and the plurality of requirements on the user interface;
    wherein the mobile communication device is configured to call a plurality of tool functions from the tool library, wherein the plurality of tool function comprises at least one of a 3D LiDAR Tool, a video tool, or an image tool;
    wherein the mobile communication device is configured to perform a task of the plurality of tasks on the task list using a tool function of the plurality of tool functions;
    wherein the mobile communication device is configured to mark the task as finished on the task list;
    wherein the server is configured to output a result for at least one requirement.

12. The system according to claim 11 wherein a format of the file is Word Doc, PDF, web URL, JPG, PNG, GIF.

13. The system of claim 11 in which the extraction engine is a large language model.

14. The system of claim 11 in which the database is a vector database.

15. The system of claim 11 in which the result output is a pass, fail, or partial pass.

16. The system of claim 11 in which the result output is an error or request to complete another task.

17. The system of claim 11 in which the result output is a description of a requirement and the manner in which the requirement was not met.

18. The system of claim 11 in which the result output is a description of a requirement and the manner in which the requirement was met.

19. The system to claim 11 wherein the task list is aligned to a local or regional standard.

20. The system according to claim 11 wherein the task list is aligned to an International Building Code 1011.5 from the International Code Council.

\* \* \* \* \*